United States Patent [19]
Hillmann

[11] Patent Number: 5,082,375
[45] Date of Patent: Jan. 21, 1992

[54] COMPOSITE CAGE

[75] Inventor: Reinhart Hillmann, Schweinfurt, Fed. Rep. of Germany

[73] Assignee: SKF GmbH, Schweinfurt, Fed. Rep. of Germany

[21] Appl. No.: 617,604

[22] Filed: Nov. 26, 1990

[30] Foreign Application Priority Data

Nov. 29, 1989 [DE] Fed. Rep. of Germany ... 8914085[U]

[51] Int. Cl.⁵ .............................................. F16C 33/41
[52] U.S. Cl. ................................... 384/526; 384/531; 384/578
[58] Field of Search ............... 384/526, 531, 578, 533, 384/525, 579

[56] References Cited

U.S. PATENT DOCUMENTS

| | | | |
|---|---|---|---|
| 924,904 | 6/1909 | Hess | 384/526 |
| 1,013,518 | 1/1912 | Schilling | 384/531 |
| 2,696,412 | 12/1954 | Blair | 384/578 |
| 4,626,113 | 12/1986 | Forknall et al. | 384/526 |

Primary Examiner—Lenard A. Footland
Attorney, Agent, or Firm—Eugene E. Renz, Jr.

[57] ABSTRACT

Composite cage for rolling bearings, consisting of cage segments with pockets to hold the rolling elements, the cage segments being held together by connecting elements, characterized in that the cage segments (1a, 1b, 1c and 1d) have axially outward-pointing projections (7, 8) with openings (9) to hold the connecting elements (3, 4).

12 Claims, 2 Drawing Sheets

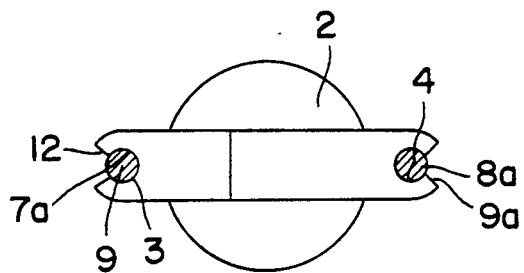
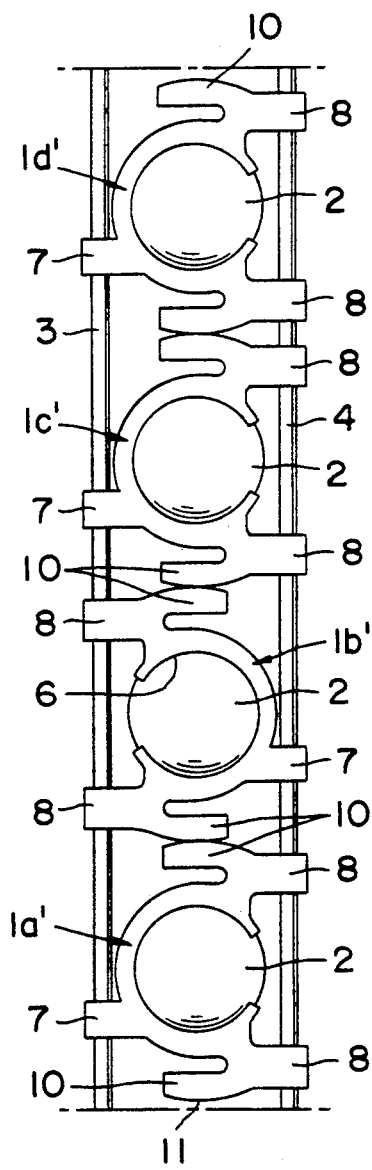
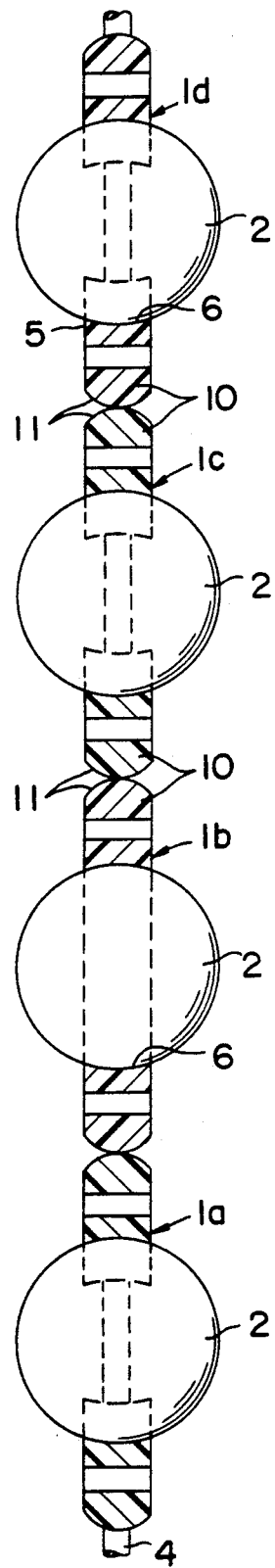

1

COMPOSITE CAGE

FIELD OF THE INVENTION

The present invention relates to improvements in cages for rolling bearings. More specifically, the present invention relates to improvements in so-called composite cages which consist of segments having pockets to support rolling elements which are held together by at least one connecting member.

BACKGROUND OF THE INVENTION

A composite cage comprising segments held together by a connecting member is shown in West Germany Utility Model No. 71-47,388. In the design of this cage, the parts of the cage must be deformed or welded which means the production costs are relatively high.

SUMMARY OF THE INVENTION

With the foregoing in mind, it is the object of the present invention to provide an improved composite cage characterized by novel features of construction and arrangement consisting of easily fabricated parts which can be assembled in an extremely efficient manner. To this end, in accordance with the present invention, the cage comprises a plurality of cage segments having axially outwardly directed projections with openings for connecting elements. By reason of this particular design and configuration, it is much easier to assemble the cage. In accordance with the present invention, the cage lends itself to use of segments made of plastic and further it is possible to incorporate connecting elements made of steel to compensate for the thermal expansion behavior of the connecting elements of the cage.

In accordance with another feature of the present invention, the cage segments are in the nature of comb-like retaining parts for ease of insertion of the rolling elements in the retaining parts.

In accordance with still another feature of the present invention, the cage includes elastic tongues on at least one side of the cage elements which engage at contact points between the cage segments in the circumferential direction so that the individual cage segments can be pressed against each other.

BRIEF DESCRIPTION OF THE DRAWINGS

These and other objects of the present invention and the various features and details of the operation and construction thereof are hereinafter more fully set forth with reference to the accompanying drawings, where:

FIG. 2 is a transverse sectional view take on lines 2—2 in FIG. 1;

FIG. 3 is a transverse sectional view taken on lines 3—3 of FIG. 1; and

FIG. 4 is a developed plan view similar to FIG. 1 showing a modified version of the present invention.

DETAILED DESCRIPTION OF THE PREFERRED EMBODIMENT

Figure 1:
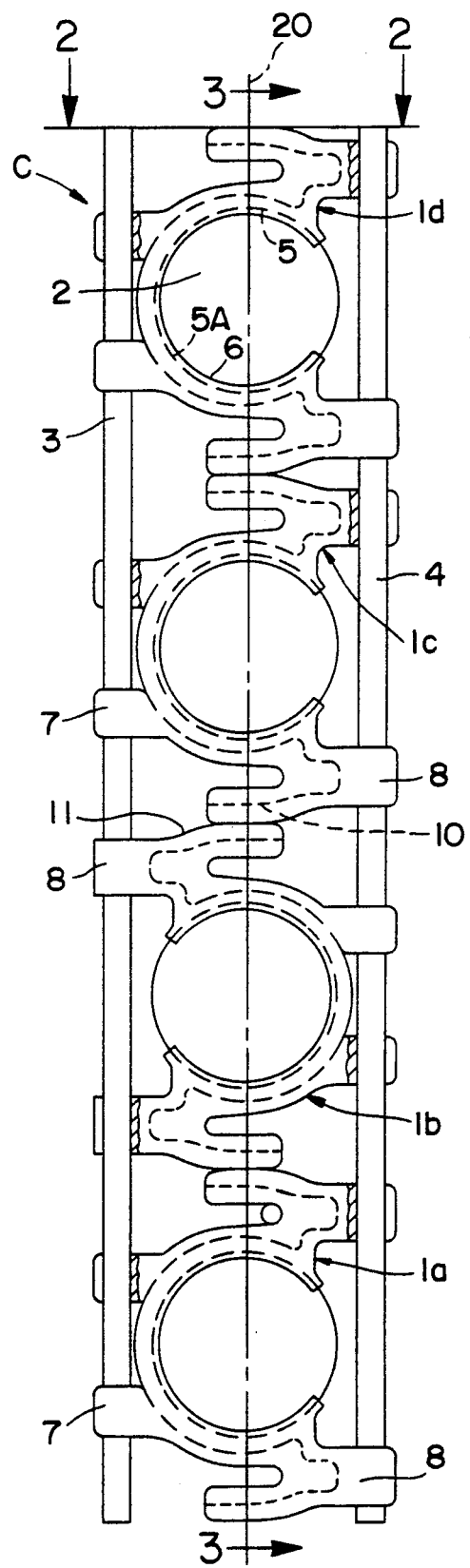
FIG. 1 is a developed plan view of a composite cage assembly made in accordance with the present invention.

Referring now to the drawings, the composite cage of the present invention which is generally designated by letter C is configured for large radial rolling bearings and consists of a plurality of discrete cage segments 1a, 1b, 1c, 1d, ... which are preferably made of plastic and which are of a generally U-shaped configuration to embrace or snap around rolling elements 2. The cage segments 1a, 1b, 1c, and 1d as illustrated in the drawings comprise a comb-like retaining part 5. Each cage segment shown in the plan view of the developed cage in FIG. 1 is of a generally U-shaped or horseshoe shaped configuration consisting of a body portion or retaining section 5 having a an arcuate interior surface 5A defining a pocket 6 for holding and enclosing a rolling element such as a ball 2 with play so that the balls are guided and held in the pockets 6. A pair of closely spaced projections 7, 8 extend outwardly from the closed end of the retaining part 5. The projections 7, 8 have as best illustrated in FIG. 2 aligned openings 7a, 8a within which an elongated cage ring 3 is snap fitted to hold the cage segments in end to end abutting relation in the manner shown in FIG. 1. The entrance walls 9a to the opening 9 are beveled or slanted as at 12 to facilitate easy assembly of the rod like retaining rings 3,4 and disassembly of the cage segments by simply snapping the rod like retaining ring 3,4 out of the grooves of the cage segments.

Each cage segment also includes flexible tongues 10 which, in the present instance, extend rearwardly from the projections 8. The elastic tongues 10 extend beyond the center line 28 of the cage and have contact surfaces 11 which are convex to provide point contact between the tongues 10 of adjacent cage segments 1a, 1b, 1c, 1d.

Consider now the assembly of a roller bearing cage constructed in accordance with the present invention. A rolling element, such as balls 2 are first assembled to each of the cage segments 1a, 1b, 1c and 1d. It is relatively easy to assemble the balls by a snap-type action with very little force by reason of the fact that the cage segments are highly elastic and the generally U-shaped configuration lends itself to easy assembly of the balls 2. The cage segments are then assembled between the cage rings 3, 4. Every other cage segment faces in a common direction. For example, cage segments 1a, 1b, alternate in their orientation so that the projections 7, 8 of one cage segment 1a are connected alternately to cage ring 3,4 respectively whereas projections 7, 8 of adjacent cage segment 1b connect cage rings 4, 3 respectively. If the number of balls 2 is odd, then two of the adjacent segments will be connected to the cage ring 3, 4. This is illustrated in the upper portion of FIG. 1 were the segments 1c and 1d would be the orientation of adjacent cage segments in an assembly where the number of balls 2 is odd. It is noted that the pitch $C_p$ circle of the cage is determined by the diameter of the cage rings 3, 4 and is therefore less dependent on temperature than a cage made purely of plastic. Moreover, for various pitch circle diameters, the cage segments 1a, 1b, 1c and 1d need only be a single size since during assembly of the composite cage, the cage segments can be bunched together or pushed more or less toward each other in the circumferential direction by reason of the flexibility of the elastic tongues 10. Additionally, in operation, the elastic tongues 10 allow the rolling elements to move toward each other.

Even though a particular embodiment of the present invention has been illustrated and described herein, it is not intended to limit the invention and changes and modifications may be made therein within the scope of the following claims. Thus, even though the cross section of the cage rings is shown as being spherical, the cross section can also be square or rectangular or other geometric shapes. The configuration of the cage pockets can easily be modified to accommodate rollers by selected modification of the retaining part 5. Additionally, even though the dual projections 7, 8 for the cage segments described is a preferred arrangement for stability, other configurations of projections are possible. For example, the cage segment may be made with two projections 8 on one side and on the opposite side with only one projection 7. Further, even though the cage segments are connected on opposite sides by a pair of retaining rings 3, 4, it is possible to connect the cage segments 1a, 1b, 1c and 1d by a cage ring on only one side. Further, the concept of the present invention lends itself to linear bearings. In this instance, elongated cage rods are utilized instead of the annular cage rings.

What is claimed is:

1. Composite cage for rolling bearings, comprising cage segments with pockets to hold the rolling elements, the cage segments being held together by connecting elements, characterized in that the cage segments (1a, 1b, 1c and 1d) have axially outwardly-pointing projections (7, 8) with openings (9) to hold the connecting elements (3, 4).

2. Composite cage according to claim 1, characterized in that the cage segments (1a, 1b, 1c and 1d) have a comb-like retaining part (5).

3. Composite cage according to claim 1, characterized in that elastic tongues (10) are provided at the contact points between the cage segments (1a, 1b, 1c and 1d) at least on one side.

4. Composite cage according to claim 3, characterized in that the elastic tongue (10) of one cage segment (1a, 1c) rests in each case against the elastic tongue (10) of an adjacent cage segment (1b, 1d).

5. Composite cage according to claim 3, characterized in that the contact surfaces (11) of the elastic tongues (10) are convex.

6. Composite cage according to claim 1, characterized in that the connections of the projections (7, of successive cage segments (1a, 1b) alternate between the connecting element (3) on one end surface and the connecting element (4) on the opposite end surface.

7. Composite cage according to claim 1, characterized in that there are two axially outward-pointing projections (7, 8) on each of the two end surfaces of the cage segments (1a, 1b, 1c and 1d).

8. Composite cage according to claim 1, characterized in that the cage segments (1c, 1d) are connected by the projections (7) on the one end surface to the one connecting element (3) and by the projections (8) on the opposite end surface to the other connecting element (4).

9. Composite cage according to claim 1, characterized in that the cage segments (1a, 1b, 1c and 1d) are provided on one side with two projections (8) and on the other side with one projection (7).

10. Composite cage according to claim 1, characterized in that the cage segments (1a, 1b, 1c and 1d) are connected on only one side to a connecting element (3, 4).

11. Composite cage according to claim 1, characterized in that the connecting elements (3, 4) consist of wire rings.

12. Composite cage according to claim 1, characterized in that the projections (7, 8) of the cage segments (1a, 1b, 1c and 1d) have openings (9) designed as snap-in seats for the connecting elements (3, 4).

* * * * *